Patented July 14, 1931

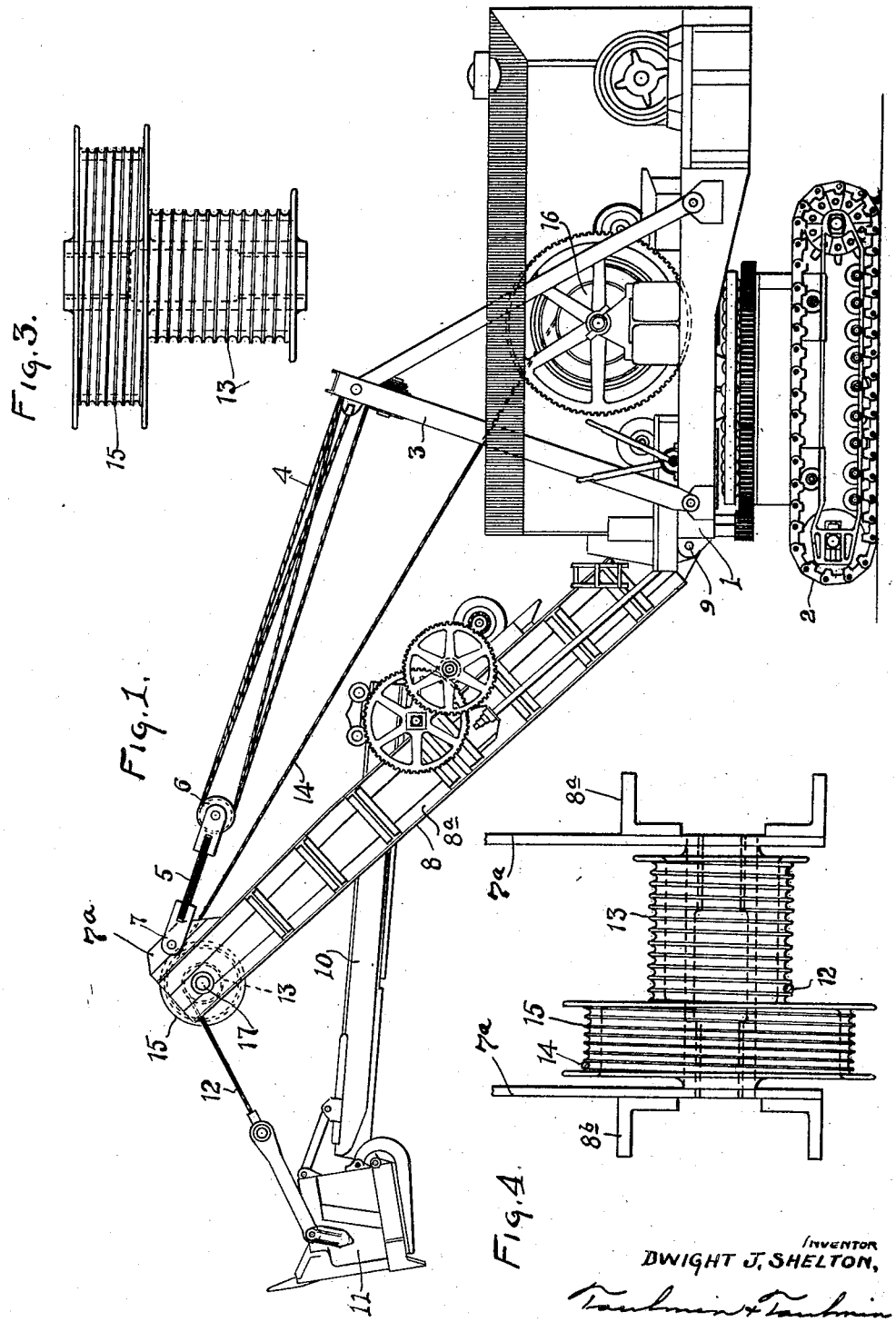

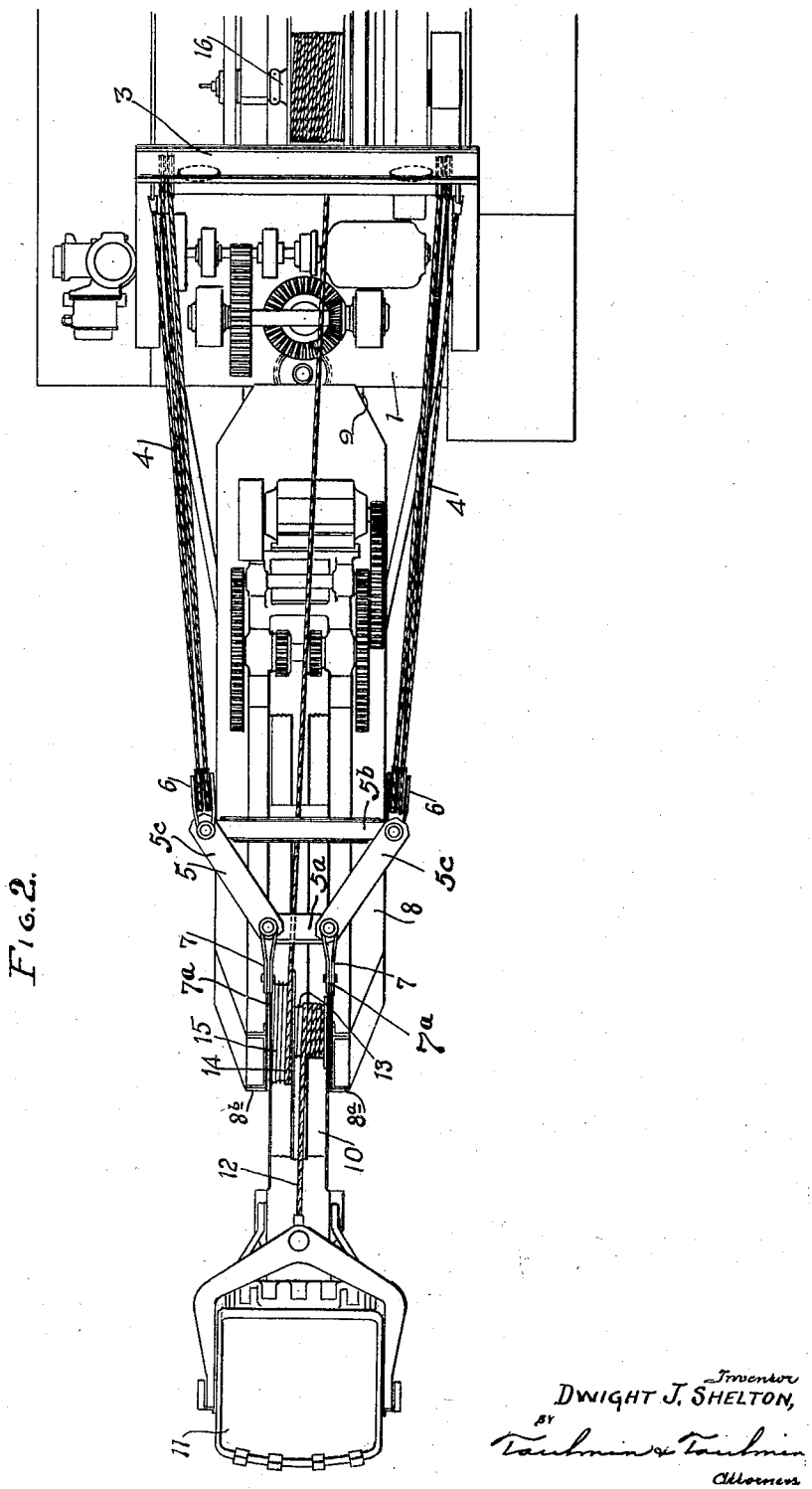

1,814,863

UNITED STATES PATENT OFFICE

DWIGHT J. SHELTON, OF MARION, OHIO, ASSIGNOR TO THE MARION STEAM SHOVEL COMPANY, OF MARION, OHIO, A CORPORATION OF OHIO

EXCAVATING APPARATUS

Application filed September 13, 1929. Serial No. 392,322.

My invention relates to excavating apparatus.

It is the object of the invention to provide for the application of power to a dipper without the necessity of a multiple looping of the dipper cable over a plurality of sheaves, thus avoiding the multiple flexing of the cable and the consequent shortening of its life.

It is an object to provide a construction of great simplicity and direct application of power through a differential drum construction directly mounted upon the end of the boom.

Referring to the drawings:

Figure 1 is a side elevation of a typical excavating machine with my invention installed thereon;

Figure 2 is a plan view thereof;

Figure 3 is a detailed view of the differential drum;

Figure 4 is an end elevation of the boom with the differential drum installed.

Referring to the drawings in detail, 1 is a swinging platform of an excavating machine mounted upon any suitable form of propelling mechanism 2. Upon this platform 1 is mounted an A-frame 3 connected to which are the usual cables 4 that run to a bail 5 and sheave 6 which are connected at 7 to the upper end of the boom 8 that is pivoted at 9 at its lower end to the swinging platform 1. The boom is composed of two pairs of spaced members 8a and 8b. To the outer end of each pair is attached a plate 7a, which affords a support for the shaft 17 on which are the drums 13 and 15. The drums may rotate on the shaft 17 or the shaft 17 may rotate in suitable bearings in the plates 7a. The plates 7a extend upwardly from the members 8a and 8b, and provide ears or extensions to which the bail 5 is suitably attached by means of connecting members 7. The bail is composed of a short transverse member 5a and a longer transverse member 5b.

To the outer ends of these two members are attached the connecting bars 5c. These four parts constituting the bail form a bail substantially in the form of a trapezoid, the smaller end of which is attached to the ears. To the wider end at each side thereof is attached a pair of single grooved pulleys 6. Around each of these pulleys 6 a cable 4 is wound for raising and lowering the outer end of the boom. One end of each cable 4 is attached to a part of the A frame 3, while the other end is attached to a suitable drum for taking up and letting off the cables. There is thus provided on the outer end of the boom a pair of plates supporting between them the differential drum member and having attached to the upper edges thereof the yoke 5, by which the end of the boom is lowered and raised through the cables 4. By means of this structure there is provided a drum and cable-operating means such as will prevent the wear of the cable 14, since all parts that are likely to contact therewith are held sufficiently spaced therefrom that this cable will not be subject to chafing by means of the structure above it.

The boom is provided with a dipper stick 10 and a dipper 11. To this dipper 11 connected in any desirable fashion is attached the free end of the cable 12 known as the dipper cable. This cable passes upwardly towards the upper free end of the boom 8 where it passes around the small drum 13 of the differential drum combination, to which it is connected. A second cable 14 is attached at one end to the large drum 15 on which it is wound, and thence passes downwardly to the cable winding and unwinding mechanism mounted on the platform 1 and generally designated 16. The exact nature of this winding and unwinding mechanism is not of importance as any desirable form may be employed.

It will be noted that the boom is composed of spaced members 8a and 8b between which the differential drum composed of the drums 13 and 15 is journaled being carried therebetween upon the shaft 17. Any desirable form of mounting of this differential may be employed, but I have illustrated one form that is satisfactory for the purpose of accomplishing my invention.

It will be understood that I desire to comprehend within my invention such modifications as may be necessary to adapt it to varying conditions and uses.

Having thus fully described my invention, what I claim as new and desire to secure by Letters Patent, is:

In an excavating machine, a supporting structure, an inclined boom on said structure having its upper end portions spaced apart, a dipper stick movably mounted on said boom, a dipper carried by said stick, plates arranged between and secured to the spaced upper portions of said boom, said plates being spaced apart and having portions extending beyond the upper edge of said boom, a pair of drums arranged between and supported by said plates, said drums being of different diameters, a cable wound on the smaller drum, having one end secured thereto and having its other end connected with said dipper, a second cable wound on the larger drum, having one end secured thereto and having its other end connected with actuating mechanism on said supporting structure, a trapezoidal element having the shorter side thereof connected near its ends with the respective plates, and boom supporting cables connected with the longer side of said element near the respective ends thereof and leading to said supporting structure.

In testimony whereof I affix my signature.

DWIGHT J. SHELTON.